United States Patent
Ott, IV

(10) Patent No.: US 8,176,058 B2
(45) Date of Patent: May 8, 2012

(54) METHOD AND SYSTEMS FOR MANAGING PLAYLISTS

(75) Inventor: Edward Stanley Ott, IV, Palo Alto, CA (US)

(73) Assignee: Yahoo! Inc., Sunnyvale, CA (US)

( * ) Notice: Subject to any disclaimer, the term of this patent is extended or adjusted under 35 U.S.C. 154(b) by 398 days.

(21) Appl. No.: 11/565,359

(22) Filed: Nov. 30, 2006

(65) Prior Publication Data

US 2008/0133525 A1 Jun. 5, 2008

(51) Int. Cl.
*G06F 7/00* (2006.01)
*G06F 17/30* (2006.01)

(52) U.S. Cl. ......... 707/752; 707/753; 707/754; 725/42; 725/89

(58) Field of Classification Search .................. None
See application file for complete search history.

(56) References Cited

U.S. PATENT DOCUMENTS

| | | | |
|---|---|---|---|
| 7,403,769 B2 * | 7/2008 | Kopra et al. ............... 455/414.1 |
| 7,613,736 B2 * | 11/2009 | Hicken ................................. 1/1 |
| 2005/0234858 A1 * | 10/2005 | Torii et al. ......................... 707/1 |
| 2006/0040609 A1 * | 2/2006 | Petschke et al. .............. 455/3.02 |
| 2006/0161635 A1 * | 7/2006 | Lamkin et al. ................. 709/217 |
| 2006/0190616 A1 * | 8/2006 | Mayerhofer et al. ......... 709/231 |
| 2006/0265409 A1 * | 11/2006 | Neumann et al. ............. 707/100 |
| 2006/0265421 A1 | 11/2006 | Ranasinghe et al. ........ 707/104.1 |
| 2006/0265503 A1 * | 11/2006 | Jones et al. ................... 709/227 |
| 2006/0265637 A1 * | 11/2006 | Marriott et al. ............. 715/500.1 |
| 2006/0268667 A1 * | 11/2006 | Jellison et al. ............. 369/30.08 |
| 2006/0277567 A1 * | 12/2006 | Kinnear .......................... 725/34 |
| 2007/0078714 A1 * | 4/2007 | Ott et al. ......................... 705/14 |
| 2007/0088832 A1 * | 4/2007 | Tsang et al. .................. 709/227 |
| 2007/0157237 A1 * | 7/2007 | Cordray et al. ................. 725/42 |
| 2007/0220048 A1 * | 9/2007 | Ott .............................. 707/104.1 |
| 2007/0245020 A1 * | 10/2007 | Ott ................................. 709/225 |
| 2007/0299874 A1 * | 12/2007 | Neumann et al. .......... 707/104.1 |

* cited by examiner

*Primary Examiner* — Khanh Pham
*Assistant Examiner* — Azam Cheema
(74) *Attorney, Agent, or Firm* — James J. DeCarlo; Greenberg Traurig, LLP

(57) ABSTRACT

The present invention relates to a computerized method and systems for managing feeds so that a user's playlists may be automatically updated in accordance with a user's desired media preferences.

18 Claims, 5 Drawing Sheets

METHOD AND SYSTEMS FOR MANAGING PLAYLISTS

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

The expansion of the Internet and the World Wide Web ("web") has given computer users the enhanced ability to listen to and to watch various different forms of media content through their computers. Such content can be in the form of audio music, music videos, television programs, sporting events or any other form of audio or video content that a user wishes to watch, read, listen to or otherwise perceive in some manner.

Multimedia data files, or media files, are data structures that may include audio, video or other content stored as data in accordance with a container format. A container format is a file format that can contain various types of data, such as data compressed in a standardized format and in a known manner. The container format allows a rendering device to identify, and if necessary, interleave, the different data types for proper rendering. Some container formats can contain only audio data, while other container formation can support audio, video, subtitles, chapters and metadata along with synchronization information needed to play back the various data streams together. For example, an audio file format is a container format for storing audio data. There are many audio-only container formats including known in the art including WAV, AIFF, FLAC, WMA, and MP3. In addition, there are now a number of container formats for use with combined audio, video and other content including AVI, MOV, MPEG-2 TS, MP4, ASF, and RealMedia to name but a few.

Media files accessible over a network are increasingly being used to deliver content to mass audiences. For example, one emerging way of periodically delivering content to consumers is through podcasting.

Podcasting is a method of publishing digital media, typically audio programs, via the Internet, allowing users to subscribe to a series of new files (e.g., .MP3 audio files) as they become available over time. The word "podcasting" became popular in late 2004, largely due to automatic downloading of audio onto portable players or personal computers. Podcasting is distinct from other types of online media delivery because of its subscription model, which uses a "feed" (such as RSS, discussed below, and Atom) to monitor for and/or deliver a file. A feed in this context refers to an electronic means that can be easily interpreted to identify new files in the list as the files are added over time, such as a file containing a list of media files. Thus, one is said to subscribe to a feed because as new files are added to the list, the subscriber is notified of the new file and, in some cases, the new file is automatically delivered to the subscriber.

Podcasting enables independent producers to create self-published, syndicated media, such as "radio shows," and gives broadcast news, radio, and television programs a new distribution method. Listeners may subscribe to feeds using "podcatching" software (a type of aggregator), which periodically checks for and downloads new content automatically. Most podcatching software enables the user to copy podcasts to portable music players. Most digital audio player or computer with audio-playing software can play podcasts. From the earliest RSS-enclosure tests, feeds have been used to deliver video files as well as audio. By 2005 some aggregators and mobile devices could receive and play video, although the "podcast" name remains most associated with audio. Other names are sometimes used for casting other forms of media, such as blogcasting for text and vcasting or vodcasting for video. For the purposes of this application, podcast and feed are used interchangeably herein and both refer in the most general sense to a feed of new files in any format (e.g., .MP3, .MPEG, .WAV, .JPG) and containing any content (e.g., text-based, audible, visual or some combination). Also, for the purposes of this discussion an individual feed may be alternately referred to as a series, and each distinct new file in the series/feed may be referred to as an episode of the series.

Podcasting is supported by underlying feed formats, of which RSS is but one example. RSS is a family of XML file formats for web syndication used by (among other things) news websites and weblogs. The abbreviation is alternately used to refer to the following recognized standards: Rich Site Summary (RSS 0.91); RDF Site Summary (RSS 0.9 and 1.0); and Really Simple Syndication (RSS 2.0).

Feed formats, such as the RSS formats, often allow the feed creator (referred to as the publisher) to include web content or summaries of web content together with links to the full versions of the content, and other meta-data. This information may be associated with different episodes of the feed, thus allowing an easy way to provide at least some summary information to the subscriber so that a subscriber does not have to render each episode to determine if it contains information of interest. This information may be delivered within an XML feed file, a web feed, an RSS stream, or RSS channel.

The technology behind podcasting allows a client to subscribe to websites that have provided RSS feeds or feeds in other formats; these are typically sites that change or add content regularly. To use this technology the client needs some type of aggregation service or aggregator. The aggregator allows a client to subscribe to the podcasts that the client wants to monitor or to get updates (i.e., future media files in the feed) on. Unlike typical subscriptions to pulp-based newspapers and magazines, RSS subscriptions are free, but they typically only provide a line or two of each article or post along with a link to the media file that contains the episode (e.g., the full text article, audio file or video file). In addition to facilitating syndication, a feed allows a website's frequent readers to track updates on the site using an aggregator.

Feeds, including RSS feeds, are widely used by the weblog community to share the latest episodes' headlines or their full text, and even attached multimedia files. In mid 2000, use of RSS for podcasting text spread to many major news organizations, including Reuters, CNN and the BBC, until under various usage agreements, providers allow other websites to incorporate their "syndicated" headline or headline-and-short-summary feeds. Feeds are now used for many purposes, including marketing, bug-reports, or any other activity involving periodic updates or publications.

A program known as a feed reader or aggregator can check feeds, such as RSS-enabled webpages, on behalf of a user and display any updated articles that it finds. It is now common to find RSS feeds on major web sites, as well as many smaller ones. Client-side readers and aggregators are typically constructed as standalone programs or extensions to existing programs like web browsers. Such programs are available for various operating systems.

Podcasting has become a very popular and accepted media delivery paradigm. This success has caused the number and variety of podcasts available to clients to grow exponentially. Potential podcast consumers are now confronted with the problems of how to find podcasts, how to organize and manage their podcast subscriptions; and how to listen to episodes efficiently and easily.

SUMMARY OF THE INVENTION

In view of the foregoing, a broad objective of the present invention is to facilitate management of media episodes.

A related objective is to facilitate the management of media episodes in a manner that helps reduce the amount of user interaction required to accomplish the management of the episodes.

In this regard, it has been recognized that management systems and methods may be utilize to facilitate management of media episodes. More particularly, it has been recognized that playlists may be utilized in conjunction with one or more computerized devices to facilitate management of episodes, where one or more episodes may be automatically associated with the playlist, and at a later time one or more of these episodes may be disassociated from the playlist when an episode is in accordance with episode removal criteria.

In one aspect of the invention, a system for managing a playlist is provided, the system comprising a playlist, one or more episodes, information relating to the one or more episodes, and a playlist management module. The playlist management module (e.g., a computerized device, such as a client computerized device or a server) is operable to associate episode(s) information with the playlist. The playlist management module is also operable to automatically disassociate at least some of this episode(s) information from the playlist when one or more of the episodes are in accordance with episode removal criteria.

In one approach, the playlist management module may receive a first request from to add a feed to a playlist (e.g., via a feed subscription). Subsequently or concomitantly, episode (s) information of the feed may be obtained (e.g., by requesting access to a subscription and querying the feed to determine whether new episodes are available for distribution), and this information may be associated with a playlist. For example, episode title information may be obtained and this information may be associated with one or more playlists. In one embodiment, at least some of the obtained information is automatically populated in a playlist of a user, such as a user-defined playlist. Thus, upon accessing the playlist, a user may review the new episodes. In this regard, a message may be displayed to the user upon accessing the playlist to inform the user of the existence and/or location of the new episodes. In a particular embodiment, this message may be display concomitant to activation of software associated with the playlist (e.g., concomitant to activation of a media player).

In another embodiment, a communication may be provided to the user to indicate that one or more of the episodes are available for review. Thus communication may be concomitant with receipt of new episode information. This communication may be an electronic communication (e.g., an e-mail, text message, telephonic message, or otherwise) or a non-electronic communication (e.g., a letter).

In one approach, the episodes may be accessed via the playlist. In this regard, the episodes may be streamed and/or downloaded to a user's computerized device, such as a home computer, a portable media player, and a portable phone, to name a few. In a particular embodiment, the above noted communication of the newly available episode step may include communication to a portable computing device and the accessing of the playlist may also include use of a portable computing device. Thus, near real-time communication and review of episodes may be facilitated. Subsequently, the episode may be automatically removed, as described in further detail below. Thus, management of playlists on portable computing device may be facilitated.

After the episode information is obtained, the user may or may not review the episode. Irrespective of a reviewing event, the episode information may be automatically disassociated from the playlist when the episode meets certain criteria. In one approach, episode data are compared to episode removal criteria. This comparing step may be initiated in a variety of ways, such as upon accessing of the playlist and/or concomitant to associating new episode information with the playlist. If the episode data are in accordance with episode removal criteria, the episode information is automatically disassociated from the playlist.

In one example, the episode removal criteria may be a number of episodes that can be stored in a playlist. Thus, if a second episode of a feed is available, information relating thereto may be obtained. This second episode information may be associated with the playlist. If this second episode information increases the number of episodes associated with a playlist above a user-defined criteria, then other episode information may be automatically disassociated from the playlist in response to the association of the second episode information. Thus, dynamic management of episodes and the playlist may be facilitated.

The episode removal criteria may be one or more of a number of criteria, such as criteria corresponding to an amount of time an episode has been associated with a playlist, a number of episodes associated with a playlist, and/or criteria corresponding to whether the episode has been reviewed, either partially or in its entirely, by the user, to name a few.

In another aspect of the invention, methods for managing a playlist is provided. These methods may include various ones of the steps described above in relation to the inventive system.

In yet another aspect of the invention, computer-readable media having instructions in conjunction with the foregoing is provided. The instructions may include many of the above operations described above in relation to the inventive system.

It is to be understood that both the foregoing general description and the following detailed description are exemplary and explanatory and are intended to provide further explanation of the invention as claimed.

BRIEF DESCRIPTION OF THE DRAWINGS

The following drawing figures, which form a part of this application, are illustrative of embodiments of the present invention and are not meant to limit the scope of the invention in any manner, which scope shall be based on the claims appended hereto.

DETAILED DESCRIPTION

Reference is now made to the accompanying figures, which at least assist in illustrating various pertinent features of the disclosed systems and methods.

Figure 1:
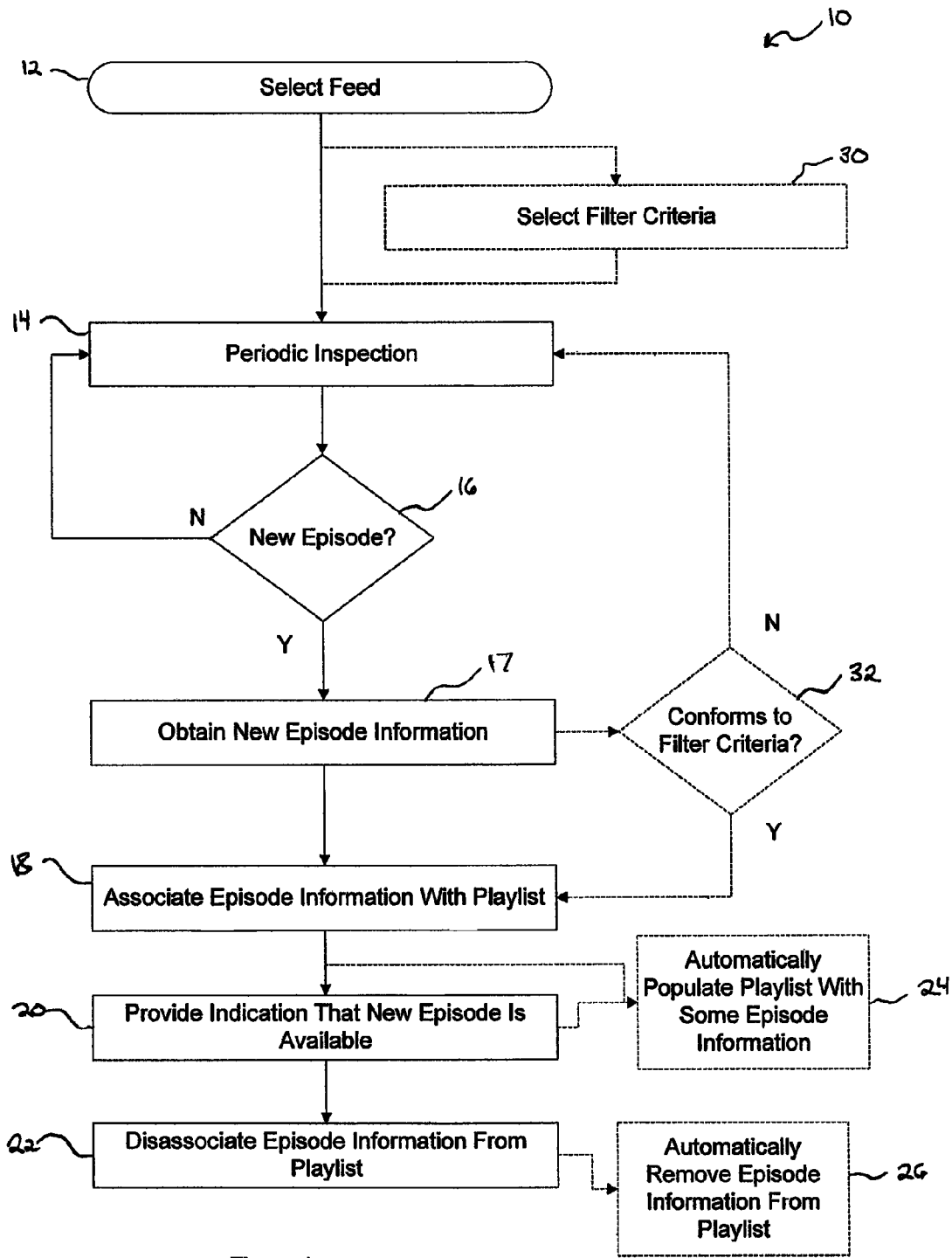
FIG. 1 illustrates one embodiment of a methodology useful in methods and systems for managing playlists.

FIG. 1 is a flowchart depicting a high-level embodiment of a method for managing a playlist, the method 10 including a feed selection step 12, in which a user interacts with a system to select one or more feeds. More particularly, the user selects one or more episodes from one or more feeds ("feed(s)"), and data associated with those selections are transmitted and received at a first location (e.g., a network computer). As time progresses, an inspection operation is periodically undertaken 14, in which the selected feed(s) are inspected to determine whether new episodes of the feed(s) are available 16. If there are no new episodes, no further action is taken until the next periodic inspection 14.

If a new episode is available, information relating to the episode is obtained 17 and this episode information is then associated with the user's playlist 18. An indication is also provided to the user that the new episode is available for review 20. Later, the episode information may be automatically disassociated from the playlist 22, as described in further detail below. Optionally, some of the episode information may be automatically populated into a portion of the playlist 24 concomitant with either the associating step 18 and/or the providing the indication step 20. Optionally, the episode information may be automatically removed (e.g., de-populated) from the playlist 26 concomitant with the disassociating the episode information step 22.

As illustrated, the user may optionally select one or more filter criteria in a criteria selection operation 30, as provided by U.S. patent application Ser. No. 11/385,489, filed Mar. 20, 2006, entitled "LIMITED AND COMBINED PODCAST SUBSCRIPTIONS", which is incorporated herein by reference in its entirety, except that the terms and definitions of the present application shall take precedent over conflicting terms in that application. In this embodiment, if there is a new episode, the information about the new episode is compared with filter criteria in a determination operation 32. If the new episode does not conform to the filter criteria, then the episode information is not associated with the playlist. If the new episode conforms to the filter criteria, then the episode information is associated with the playlist 18 and an indication is provided to the user 20, as described above.

As used herein, the terms "episode," "content", "media", or "media files" are used broadly to encompass any product type or category of renderable, experienceable, retrievable, computer-readable filed and/or stored media, either singly or collectively, and individual items of media or content are generally referred to as entries, songs, tracks, pictures, images, items or files, however, the use of any one term is not to be considered limiting as the concepts features and functions described herein are generally intended to apply to any storable and/or retrievable item that may be experienced by a user, whether aurally, visually or otherwise, in any manner now known or to become known. Further, the term content includes all types of media content such as audio and video and products embodying the same.

In selecting the feed(s) 12, any known or developed methodologies may be used. For example, a user may browse the Internet until desired feed(s) is/are located, followed by the user subscribing to the feed(s) (e.g., via RSS). Alternatively, a user may utilize a television information system (e.g., an interactive television program guide) to select desired feed(s), and provide an indication to a subscription service that additional episodes of those feed(s) are desired to be received.

As noted above, after the feed(s) is/are selected, a periodic inspection of the feed(s) 14 may occur. This periodic inspection may occur over pre-set intervals (e.g., every 15 minutes), and/or the periodic inspection may occur in response to an input or command (e.g., a user initiated query). Thus, the feed(s) may be queried to determine whether new episodes of the desired media are available for review. In another embodiment (not illustrated), a server-based aggregator may automatically push newly available media episode information to the user without the periodic inspection 14 on the user's part. Other systems for receiving episodes are also possible and any suitable method may be used.

Once it is determined that a new episode is available, information relating to the episode may be obtained 17. For example, the new episode may be tagged (e.g., include metadata) with one or more descriptive indicators, such as one or more of a genre, series, title, actor, character, duration, creation date, author, publisher, distributor, volume no., issue no., and file size indicator, to name a few. This tagging may be performed by one or more of a publisher, distributor, user or other entity. The episode information may then be obtained 17, such as by transmitting the episode information for receipt by a network computer. Concomitantly, the episode information may be associated with a user's playlist 18.

The association step 18 may be accomplished in a variety of ways. For example, a portion or whole of the episode information may be linked to one or more portions of the user's playlist. In one embodiment, when a user accesses the playlist after the new episode information has been obtained, a part or the whole of the episode information may be displayed (e.g., populated) in an appropriate portion of the user's playlist. In another embodiment, a dynamic library may be used wherein the playlist may link to the new episode information.

The playlist format may be any known or developed playlist format operable to receive episodes of media. Examples of suitable playlists are disclosed in U.S. patent application Ser. No. 11/255,524 filed Oct. 20, 2005, entitled "A SYSTEM AND METHOD FOR CREATING A PLAYLIST", which is incorporated herein by reference, except that the terms and definitions of the present application shall take precedent over conflicting terms in that application.

After or concomitant to the obtaining new episode information step 17 or the associating episode information step 18, an indication may be provided to the user that the new episode is available 20. By way of primary example, upon accessing the playlist after the new episode has been associated, the new episode information may be displayed in the playlist. In a related instance, a message may be displayed to the user via a graphical user interface to inform the user that a new episode is available. In a particular instance, the indication may be provided to the user concomitant to the user logging into a network-based account (e.g., a Yahoo! account). In another particular instance, the indication may be provided the first or subsequent time(s) the playlist is accessed after the new episode information has been associated with the user's playlist. In yet another instance, the indication may be provided concomitant to activation of software associated with the playlist (e.g., activation of a media player, discussed in further detail below). By way of other examples, the communication may be an e-mail, telephone call, text message, postal letter, or other communication that informs the user that a new episode is available.

The method 10 may also include the step of automatically disassociating the episode information from the playlist 22, so as to facilitate management of the playlist. For example, and as described in further detail below, episode data may be compared to episode removal criteria, wherein if the episode data are in accordance with episode removal criteria, information regarding one or more episodes may be automatically disassociated from the playlist.

Figure 2:
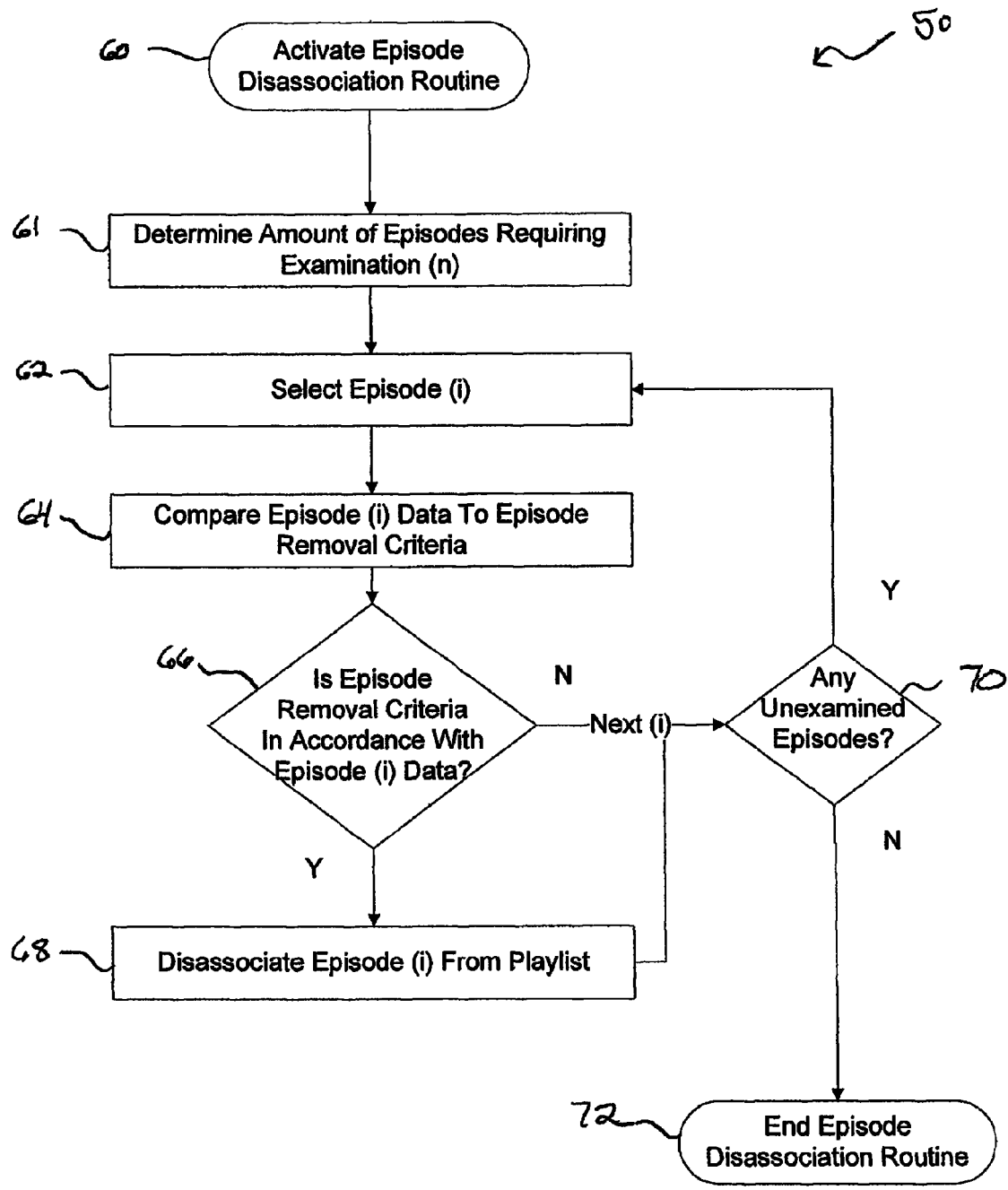
FIG. 2 illustrates one embodiment of a methodology of dynamically managing playlists.

One embodiment of an episode information disassociation method is illustrated in FIG. 2. In this embodiment, the method 50 begins with activation of an episode disassociation routine 60. The activation 60 may be prompted by a variety of events, such as, for example, the obtaining of episode information 17, association of episode information 18, or providing an indication that an episode is available 20, as described above in reference to FIG. 1. The activation 60 may be prompted by other events, such as accessing of a network-based account, accessing of a playlist, or in accordance with a predefined schedule.

Upon activation of the disassociation routine 60, the amount of episodes requiring examination is determined (illustrated as "n" episodes) 61. For example, the amount of episodes (n) can be a user-defined parameter, such as all episodes of the playlist, or preselected ones of the episodes of the playlist. After the number of episodes requiring examination is determined 61, one of those existing episodes (illustrated as episode "i") is selected for examination 62 and data associated with the episode is compared to episode removal criteria 64. If the episode data are in accordance with the episode removal criteria 66, that episode is disassociated from the user's playlist 68. After the episode is disassociated 68, it is determined whether any unexamined episodes remain 70, and, if necessary, a next episode of the "n" episodes is selected. If the episode data are not in accordance with the episode removal criteria 66, then the episode remains associated with the user's playlist and it is determined whether any unexamined episodes remain 70, as described above. This process is repeated for "n" episodes, after which the episode disassociation routine is terminated 72.

The episode removal criteria and episode data may be any criteria and data associated with the episode in conjunction with the playlist. For example, the episode removal criteria and/or data may be related to one or more of an episode accessing event (e.g., the number of times an episode has been accessed and/or reviewed), an episode associating event (e.g., the number of episodes associated with a portion of the playlist), episode creation date data, episode author data, episode character data, episode publisher data, episode distributor data, episode volume data, episode number data, and/or episode file size data. The episode removal criteria and/or data may be related to feed information. One or more of these episode criteria may be user-defined. As may be appreciated, the episode removal criteria may be different for each individual episode, the episode removal criteria may apply to some of the episodes and not to others of the episodes, and/or the episode removal criteria may apply globally to all episodes.

In one embodiment, the episode data and criteria may be related to an accessing and/or reviewing event, wherein after the episode has been accessed a predetermined number of times, which may be user-defined, the episode is automatically disassociated from the user's playlist. By way of a first example, after the user has accessed the episode, the episode may be automatically disassociated from the user's playlist after a reviewing event has been completed. By way of a second example, the episode may be removed only after the user has fully reviewed the episode irrespective of how many times the episode has been accessed.

The episode removal criteria may include a hierarchical structure, wherein one or more criteria may be designated as primary removal criteria, secondary removal criteria and so on, with the primary removal criteria being of higher priority than the secondary removal criteria in the disassociating step, with secondary removal criteria being of higher priority than the tertiary removal criteria in the disassociating step, and so on. For example, the episode removal criteria and data may be related to an episode associating event. In this embodiment, the user may define primary removal criteria as a maximum number of episodes that can be associated with a portion of the playlist. Upon exceeding the maximum number of permissible episodes associated with the portion of the playlist, one or more episodes may be automatically disassociated from the playlist. In this regard, secondary episode criteria may be utilized to facilitate determination of which episodes should be disassociated from the playlist. For example, the episode(s) with the oldest associating date may be selected for disassociation. Episode author, actor, character, file size, and other episode data may also/alternatively be used to facilitate determination of which episode(s) to disassociate from the playlist. A combination of any of the above-listed episode removal criteria may be utilized in this regard.

Figure 3:
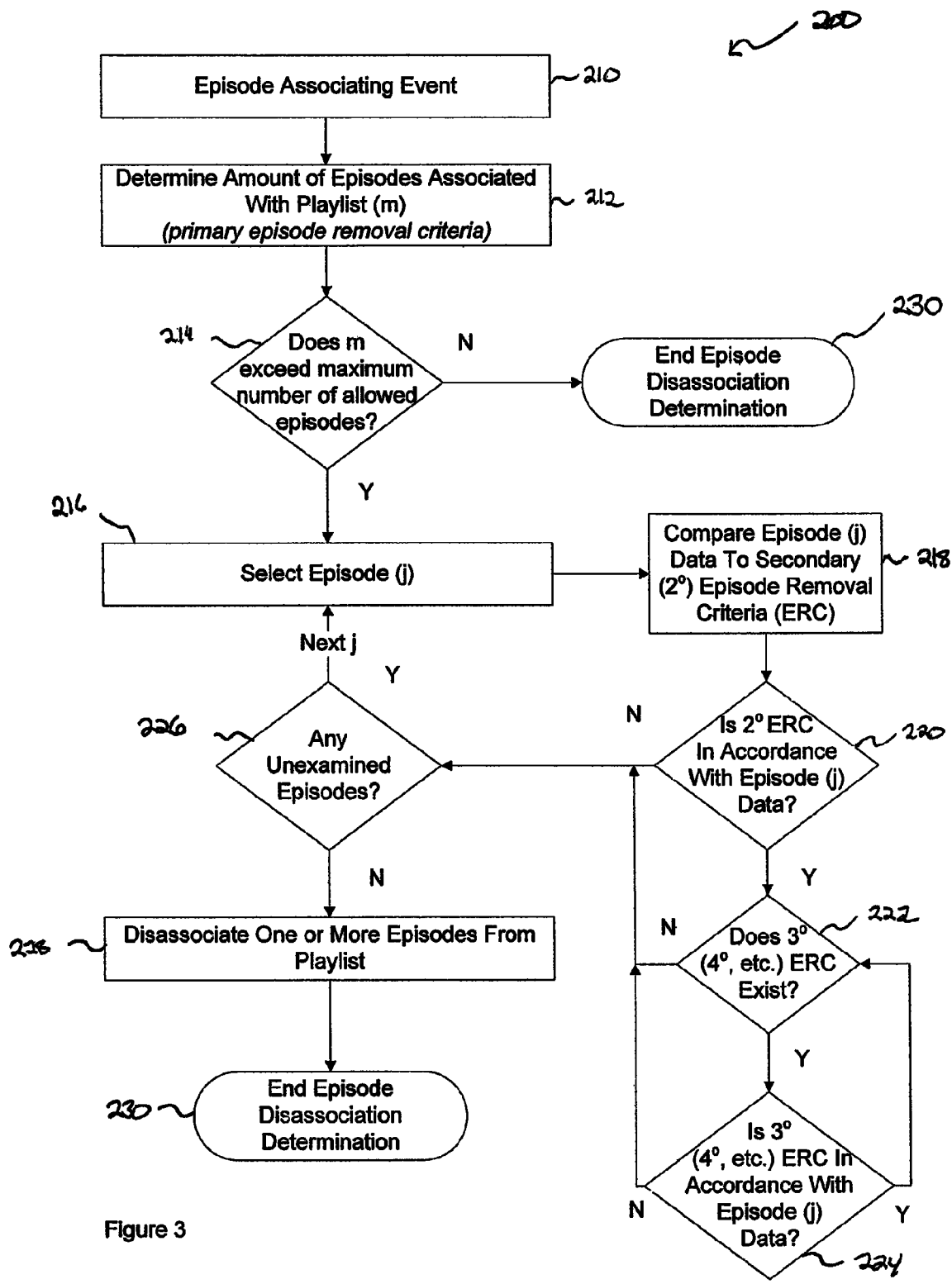
FIG. 3 illustrates one embodiment of a methodology of dynamically managing playlists.

One embodiment of a method for managing playlists in conjunction with an associating event is illustrated in FIG. 3. In this embodiment, the method 200 begins with an episode associating event 210 (e.g., an episode information associating event 18 as in FIG. 1), after which the number of episodes associated with the playlist is determined 212 (illustrated as "m"), which, in this case, is the primary episode removal criteria. If the number of episodes "m" does not exceed the maximum number of allowed episodes 214, then the episode disassociation determination is ended 230.

If the number of episodes "m" does exceed the maximum number of allowed episodes 214, one of those episodes (illustrated as episode "j") is selected 216, and episode data from one of more of those episodes may be compared to secondary episode removal criteria 218. If the secondary episode removal criteria (e.g., episode association date) is in accordance with the episode data 220, then that value is stored and it is then determined whether tertiary episode removal criteria exists 222. If tertiary episode removal criteria exists, that criteria is compared to the episode data 224, and if that episode removal criteria is in accordance with the episode data, then that value is stored and it is then determined whether quaternary episode removal criteria exists, and so on and so forth. If the secondary, tertiary, etc. episode removal criteria is/are not in accordance with episode data, then it may be determined whether any unexamined episodes exists 226. If such unexamined episodes exist, then a next one of the episodes is selected and the secondary, tertiary, etc. removal criteria is compared to episode data for those unexamined episodes, as described above. This process repeats until all necessary episodes have been examined, after which one or more of those episodes are disassociated from the playlist 228 and the episode disassociation determination is ended 230. By way of primary example, the secondary episode removal criteria may be a date criteria and all episodes having an association date older than the date criteria may be disassociated from the playlist. By way of secondary example, the secondary episode removal criteria may be a date criteria, and the oldest one of a set of episodes may be disassociated from the playlist.

As may be appreciated, the methodology of FIG. 3 may be utilized in accordance with events and/or data other than an associating event, such as any of the events or data described above in reference to FIG. 1 or 2. Moreover, this methodology may be employed for all episodes or a partial set of episodes. Furthermore, the disassociation determination may be undertaken for all episodes (e.g., to globally compare all episode association dates to facilitate selection of the oldest one(s) of the episodes), or the disassociation determination may be undertaken until one of the episodes is in accordance with all or a preselected portion of its episode removal criteria (e.g., a first episode that is older than a episode date criteria), whereupon that episode is disassociated from the playlist, thereby placing the number of episodes associated with the playlist in accordance with a threshold value.

Figure 4:
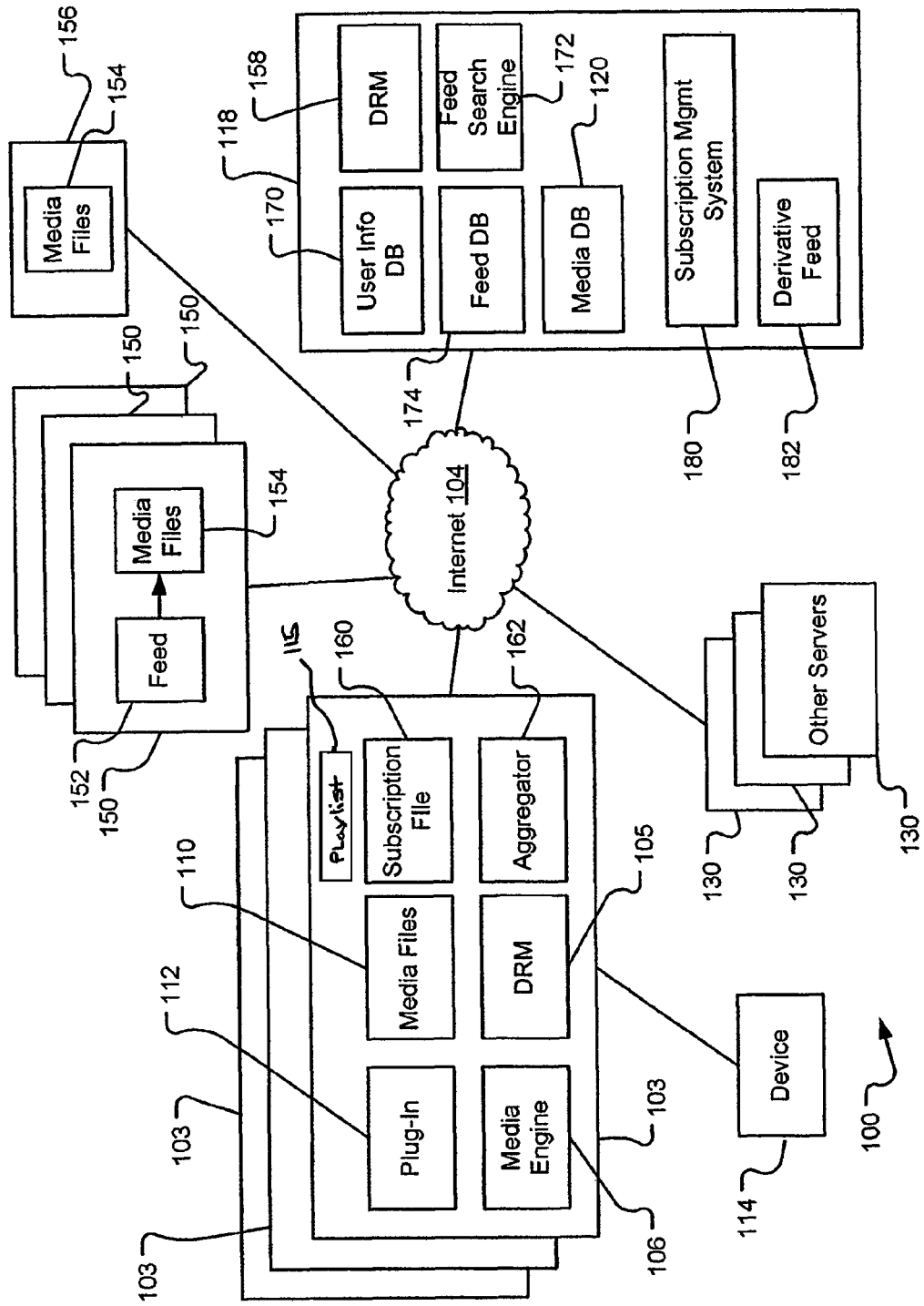
FIG. 4 illustrates one embodiment of architecture useful in a playlist management scheme.

Various computer architecture arrangements may be utilized to facilitate managing playlists. One embodiment of a useful computing architecture is illustrated in FIG. 4. Although numerous exemplary embodiments will be discussed in terms of music and/or audio files, this invention can also be utilized with any form of audio, video, digital or analog media content, as well as any other media file type now known or to become known.

In the illustrated embodiment of FIG. 4, each user utilizes a computing device 103 to facilitate management of the playlist, such as personal computer (PC), web enabled cellular telephone, personal digital assistant (PDA) or the like, coupled to a network 104, such as the Internet as shown, by any one of a number of known manners. Furthermore, each computing device 103 preferably includes an Internet browser (not shown), such as that offered by Mozilla Corporation under the trade name FIREFOX, or that offered by Microsoft Corporation under the trade name INTERNET EXPLORER or the software or hardware equivalent of the aforementioned components that enable networked intercommunication between users and service providers and/or among users.

Each computing device 103 also includes a media engine 106 that, among other functions to be further described, provides the ability to convert information or data into a perceptible form and manage media related information or data so that user may personalize their experience with various media. The media engine 106 may be incorporated into computing device 103 by a vendor of computing device 103, or obtained as a separate component from a media engine provider or in some other art recognized manner. As will be further described below, it is contemplated that media engine 106 may be a software application, or a software/firmware combination, or a software/firmware/hardware combination, as a matter of design choice, that serves as a central media manager for a user and facilitates the management of media files and services that the user might wish to access either through a computer or a personal portable device or through network devices available at various locations via a network. As used herein, the term media file is used generically to refer to an item of media, as well as associated metadata and/or network location information for that item. A computing device 103 may also be referred to as a rendering device to indicate that it is adapted to retrieve and render media files from the network.

A computing device 103 also may include storage of local media files 110 and/or other plug-in programs 112 that are run through or interact with the media engine 106. In one embodiment, media files 110 are audio files. In another embodiment, media files are video files. In yet another embodiment, media files can be a combination file compatible with a MPEG-21 standard or the like. Computing device 103 also may be connectable to one or more portable devices 114 such as a compact disc player and/or other external media file player, commonly referred to as an MP3 player, such as the type sold under the trade name ipod by Apple Computer, Inc., that is used to portably store and play media files.

Local files may be stored on a mass storage device (not shown) that is connected to the computing device 103 or alternatively may be considered part of the computing device 103. The mass storage device and its associated computer-readable media, provide non-volatile storage for the computing device 103. Although the description of computer-readable media contained herein refers to a mass storage device, such as a hard disk or CD-ROM drive, it should be appreciated by those skilled in the art that computer-readable media can be any available media that can be accessed by the computing device 103.

By way of example, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other medium which can be used to store the desired information and which can be accessed by the computer.

Additionally, computing device 103 may contain Digital Rights Management software (DRM) 105 that protects the copyrights and other intellectual property rights of the user's media files by enabling secure distribution and/or preventing or hampering illegal distribution of the media files. In one embodiment, DRM 105 encrypts or decrypts the media files for controlled access by authorized users, or alternatively for marking the content with a digital watermark or similar method so that the content can not be freely distributed. Media engine 106 preferably uses the DRM information to ensure that the media files being experienced through media engine 106 are not copied to or shared with users that are unauthorized to listen to or view the content.

The computing device 103 may include the software necessary to subscribe to feeds. In the embodiment shown, the computing device 103 includes a subscription file 160, such as an OPML file. The subscription file 160 maintains information that identifies what feeds the user has subscribed to. The subscription file 160 may include a list of feeds 152 and the feed locations.

The computing device 103 may also includes an aggregator 162. The aggregator 162 can perform the podcatching functions of an aggregator and can periodically poll the feeds identified in the subscription file 160 to determine if new episodes of the feed are available. Upon determination that a new episode is available, the aggregator 162 may notify the user (e.g., via indicating step 20 of FIG. 1) or may automatically download the episode to the computing device, such as by retrieving it from a location, such as a media server 150, via the network 104.

In an alternative embodiment, the computing device 103 may include a subscription management system as a separate module (not shown) or as part of the aggregator 162 or some other module.

The architecture 100 also includes subscription server 118. In addition to serving media over the Internet 104 to the user, subscription server 118 also preferably includes a media database 120, which stores or communicates with storage of various metadata attributes of each particular piece of media. Database 120 may be distributed over multiple servers or locations. Other servers 130 make other content and services available and may provide administrative services such as managing user logon, service access permission, digital rights management, and other services made available through a service provider. Although some of the embodiments of the invention are described in terms of music, embodiments can also encompass any form of streaming or non-streaming media including but not limited to news, entertainment, sports events, web page or perceptible audio or video content. It should be also be understood that although the present invention is sometimes described in terms of media content and specifically audio content, the scope of the present invention encompasses any content or media format heretofore or hereafter known.

The subscription server 118 includes a database 170 of user information. The user information database 170 includes information about users that is collected from users or generated by the subscription server 118 as the user interacts with the subscription server 118. In one embodiment, the user information database 170 includes user information such as user name, gender, e-mail and other addresses, user preferences, etc. that the user may provide to the subscription server 118. In addition, the server 118 may collect information, such as what feeds the user has subscribed to, what searches the user has performed, how the user has rated various feeds, etc. In effect, any information related to the user and the feeds that user subscribes to that is available to the subscription server 118 may be stored in the user information database 170.

In one embodiment a user may use the subscription server as a central manager of the user's subscriptions, instead of having multiple devices 103, each subscribed to different feeds. In this embodiment, all subscription information associated with the user is stored in the user information database 170, including the list of feeds that the user is currently subscribed to. This subscription information is updated over time to reflect user actions such as subscribing to new feeds and unsubscribing to feed.

The user information database 170 may also include information about a user's devices 114. The information allows the subscription server 118 to identify the device and differentiate it from the processor 103. Furthermore, it is anticipated that a single user may have multiple different processors 103 and each processor 103 may be associated with different information. For example, a user may subscribe to a news feed on a mobile device such as a smart phone or similar Internet connected mobile device and may subscribe to a gaming feed on a home computer. The user information database 170 contains all this information. In one embodiment, the user information database 170 may include the same information contained in the processor's subscription file 160 for each processor associated with the user. The user information database 170 may even include one or more files in the OPML file format for each user.

In the embodiment shown, the subscription server 118 includes a feed database 174. The feed database 174 may include a list of feeds known to the server 118. This list may be periodically refreshed as the server 118 searches for new feeds 152 and for feeds 152 that have been removed from access to the internet 104. Such a feed database 174 may not be necessary if the searching ability of the server 118 is sufficient to quickly provide user with updated and accurate feed information in response to a user search. The feed database 174 may include all of the information provided by the feed 152. In addition, the feed database 174 may include other information generated by the subscription server 118 or by users. Thus, the feed database 174 may contain information not known to or generated by the publisher of the feed 152.

In an embodiment, the feed database 174 includes additional information regarding feeds 152 in the form of "tags." A tag is a keyword chosen by a person accessing the subscription server 118 to describe a particular feed 152. The tag can be any sequence of characters and spaces (e.g., Emn8 ^NG), generally represented by a combination of key strokes. Each tag submitted to the subscription server may be recorded in the feed database 172 and associated with the feed the tag describes. Tags may be associated with a particular feed 152 (e.g., a series tag) or associated with a specific media file 154 within the feed 152 (e.g., an episode tag). Tags will be discussed in greater detail below.

Since tags can be any keyword, a typical name for a category, such as "science" or "business," may also be used as a tag and in an embodiment the initial tags for a feed are automatically generated by taking the category designations from a feed and using them as the initial tags for the feed. However, note that tags are not a hierarchical category system that one "drills down" through. Tags are not hierarchically related as is required in the typical categorization scheme. Tags are also cumulative in that the number of users that identify a series or an episode with a specific tag are tracked. The relative importance of the specific tag as an accurate description of the associated content (i.e., series or episode) is based on the number of users that associated that tag with the content.

In an embodiment, consumers of feeds 152 are allowed to provide information to be associated with feeds or particular episodes. Thus, the user after consuming data may rate an episode, say on a scale of 1-5 stars, write a review of the episode, and enter tags to be associated with the episode. All this consumer-generated data may be stored in the feed database 174 and associated with the appropriate episode for use in future searches. For example, in an embodiment such community generated information is used as part of the determination operation 18 to determine if an episode conforms to specified filter criteria.

In one embodiment, the search engine 172, discussed below, creates a new entry in the feed database 174 for every feed 152 it finds. Initially, the entry contains some or all of the information provided by the feed 152. An automatic analysis may or may not be performed to match the feed 152 to known tags based on the information provided in the feed 152. For example, in an embodiment some RSS feeds include a category element and the categories listed in that element for the feed are automatically used as the initial tags for the feed. While this is not the intended use of the category element, it is used as an initial tag as a starting point for the generation of more accurate tags for the feed. Note that searches on terms that appear in the feed 152 will return that feed as a result, so it is not necessary to provide tags to a new entry for the search to work properly. Initially no ratings information or user reviews are associated with the new entry. The manager of the subscription server may solicit additional information from the publisher such as the publisher's recommended tags and any additional descriptive information that the publisher wishes to provide but did not provide in the feed 152 itself.

In addition to maintaining information specific to series and individual episodes within the series, the feed database 174 may also include information associated with publishers of the feeds, sponsors of the feeds, or people in the feeds.

The subscription server 118 includes a feed search engine 172. The feed search engine 172 provides a graphical user interface to users allowing the user to search for and subscribe to feeds 152 using the subscription server 118. The graphical user interface may be an .HTML page served to the processor 103 for display to the user via a browser. Alternatively the graphical user interface may be presented to the user through some other software on the processor 103. An example of a feed search engine and its graphical user is discussed in commonly owned U.S. patent application Ser. No. 11/346,777, filed Feb. 2, 2006, which is hereby incorporated herein by reference, except that the terms and definitions of the present application shall take precedent over conflicting terms in that application. Through the graphical user interface, the feed search engine 172 receives user search criteria. The search engine 172 then uses these parameters to identify feeds 152 that meet the user's criteria. The search may involve an active search of Internet through the use of a web crawler, a search of the feed database 174, or some combination of both 174. The search may include a search of the descriptions provided in the feed 152 of the series and each particular episode in the series. The search may also include a search of the tags and other information associated with feeds 152 listed in the feed database 174, but not provided by the feeds themselves. The results of the search are then displayed to the user via the graphical user interface.

In one embodiment of the present invention, similar to the DRM software 105 located on the user's processor 103, the subscription server may maintain its own DRM software 158 which tracks the digital rights of media files located either in the media database 120 or stored on a user's processor. Thus, for example, before the subscription server 118 streams or serves up or transfers any media files to a user, it validates the rights designation of that particular piece of media and only serves streams or transfers the file if the user has the appropriate rights.

The architecture 100 also includes a number of servers 150 that publish feeds. That is, the servers 150 include one or more feeds 152, such as RSS feeds, that are accessible through the network, in this case the Internet 104. The feeds 152 may include feed information about the feed (e.g., series information) as well as information about the various media files 154 (e.g., episodes) of the feed 152 (e.g., episode information). The feed 152 also identifies the media files 154 so that they can be retrieved by an aggregator on a processor 103. The media file 154 may reside on the feed server 150 with the feed 152, or may be located on another server 156.

As illustrated in FIG. 4, each user's processor 103, the subscription server 118 and feed servers 150, as well as the other servers 130, 156 are communicatively connected via the Internet 104. In alternate embodiments, different components of the architecture 100 may be communicatively coupled differently, for example each may be coupled directly to each other wirelessly or by a local or wide area network (WAN) or the like. Additionally, functional components can be distributed so that certain functions of the media engine may be performed at subscription server 118, or vice versa, or distributed in modular fashion for operation at various locations throughout the architecture 100. Thus, the description herein of a function or component being associated with a particular device or component or location is merely exemplary.

The architecture 100 further includes a subscription management system 180. The subscription management system 180 allows a user to determine what future episodes of a feed will be presented to the user. The subscription management system 180 allows a user to select filter criteria that the subscription management system 180 will then use to identify future episodes that are of interest to the user, as described in U.S. patent application Ser. No. 11/385,489, filed Mar. 20, 2006, entitled "LIMITED AND COMBINED PODCAST SUBSCRIPTIONS".

As noted, the system 100 includes one or more media engines 106, such as WINDOW MEDIA PLAYER, by Microsoft, Corp. or REALPLAYER, by Real Networks, Inc. Such engines may be utilized in conjunction with a playlist 115. The playlist 115 may be any known or developed playlist operable to convey episodes of media. Examples of suitable playlists are disclosed in U.S. patent application Ser. No. 11/255,524 filed Oct. 20, 2005, entitled "A SYSTEM AND METHOD FOR CREATING A PLAYLIST" as described above. In the illustrated embodiment, the playlist 115 is located on a computerized device 103, such as on a client computer. In another embodiment, the playlist may be located on a server 118, or at location remote from the client's hardware.

Any of the playlists associated with the media engine may be managed in accordance with the above-described methodologies, and a graphical user interface may facilitate management of the playlist. For example, the user may utilize a graphical user interface to create playlists and/or select one of the playlists associated with a media engine. The user may associate episodes of one or more feeds with one or more of those playlists. The user may also select episode removal criteria for one or more of the playlists and/or episodes using a graphical user interface. The user may select disassociation determination activation routine criteria using a graphical user interface. Thus, as new episodes are associated with one or more of the playlists, such as by automatically populating the playlist(s) with the new episode information (e.g., via a subscription), older episodes may be automatically disassociated from the playlist(s) and the episode information automatically removed from such playlist(s), thereby facilitating dynamic management of the playlist and dynamic presentation of playlist data/information to the user via a graphical user interface.

Figure 5:
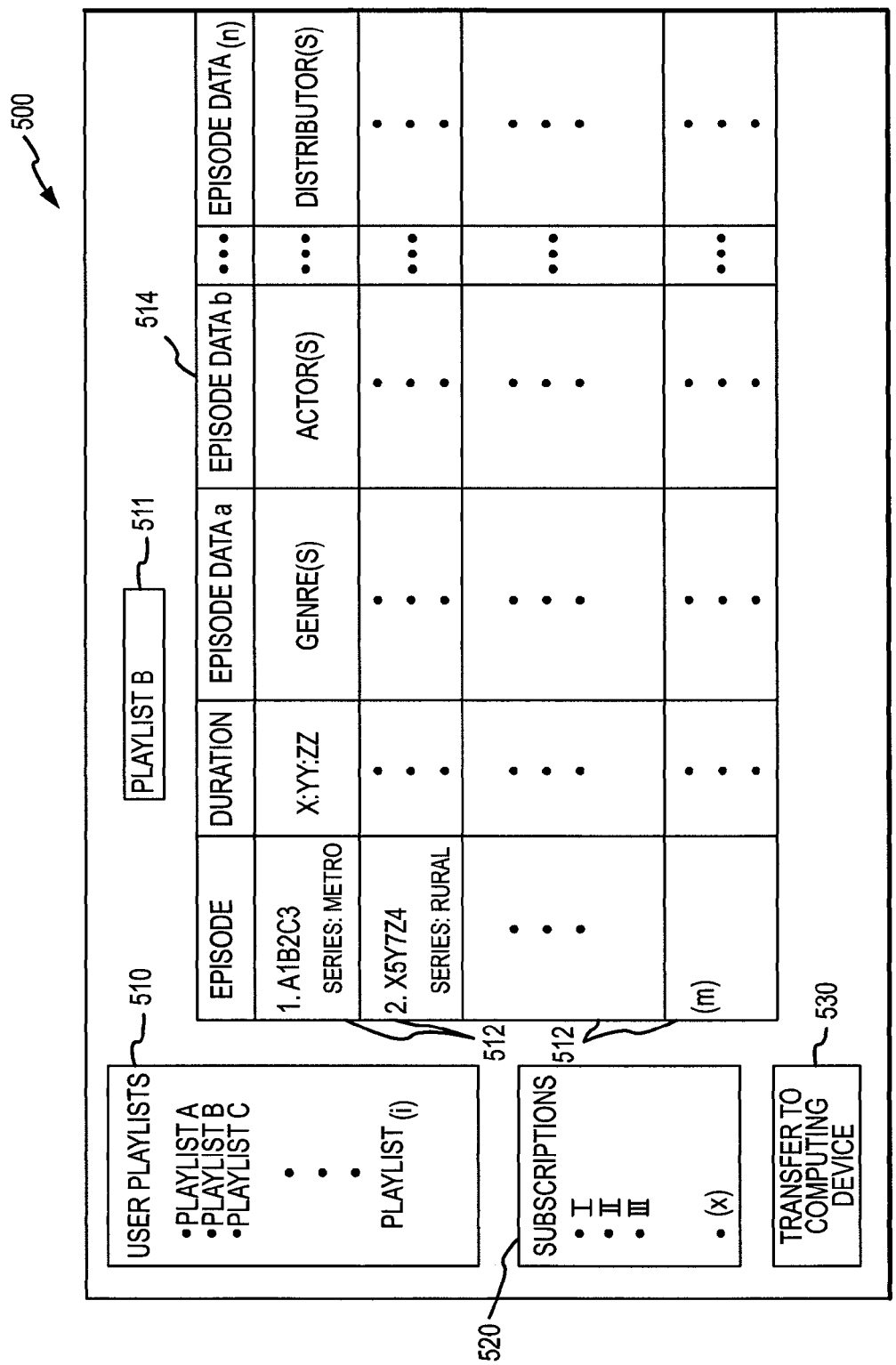
FIG. 5 illustrates one embodiment of a graphical user interface useful in assisting management of playlists.

One embodiment of a playlist/media engine arrangement is illustrated in FIG. 5. The media engine is displayed on a graphical user interface 500, which displays a series of user playlists section 510. In the illustrated embodiment, Playlist B has been selected, as depicted by heading 511, and the episodes 512 of Playlist B are displayed in table 514. The table 514 includes various information regarding each of the episodes 512 of Playlist B, such as the episode title and series information of column 1, duration information of column 2, and other information in the other columns of table 514, illustrated as Episode Data A through Episode Data$_{(n)}$, examples of which are genre(s), actor(s), and distributor(s) information, as illustrated.

The playlist may include any number of episodes 512, as illustrated in column 1, which shows Playlist B as having "m" episodes. These episodes 512 may be one or more dynamically managed episodes, as described above, or may be one or more non-dynamically managed episodes, such as user-managed episodes (e.g., permanently saved songs) associated with a playlist. The dynamically managed episodes and the user-managed episodes may be displayed via the graphical user interface 500 and different indicators may be used to distinguish dynamically managed episodes from user-managed episodes. For example, different visual indicators (e.g., different text and/or colors) or different audio indicators may be utilized to distinguish dynamically managed episodes from user-managed episodes. The graphical user interface 500 may employ appropriate software to facilitate activation and use of the indicators. Thus, the graphical user interface 500 may facilitate ready determination of which episodes are dynamically managed episodes and which episodes are user-managed episodes.

The graphical user interface 500 may also display subscription information associated with the media engine and/or playlists as illustrated by subscription list 520. Those subscriptions may be managed and utilized as previously described. As noted above, the episodes may be reviewed via streaming or downloading to a computerized device. In the latter regard, a transfer button 530 may be displayed via the graphical user interface 500 to facilitate transfer of the episode(s) to a computerized device.

Those skilled in the art will recognize that the methods and systems of the present invention may be implemented in many manners and as such is not to be limited by the foregoing exemplary embodiments and examples. In other words, functional elements being performed by a single or multiple components, in various combinations of hardware and software, and individual functions can be distributed among software applications at either the client or server level. In this regard, any number of the features of the different embodiments described herein may be combined into one single embodiment and alternate embodiments having fewer than or more than all of the features herein described are possible. For example, the above discussed methods could be used to manage multiple playlists within a single file.

Functionality may also be, in whole or in part, distributed among multiple components, in manners now known or to become known. Thus, myriad software/hardware/firmware combinations are possible in achieving the functions, features, interfaces and preferences described herein. Moreover, the scope of the present invention covers conventionally known and features of those variations and modifications through the system components described herein as would be understood by those skilled in the art.

What is claimed is:

1. A method comprising:
   receiving, at a computing device on a network, a first request to add a subscription feed to a user playlist, the feed comprising a plurality of episodes, the feed initially not present in the playlist prior to said first request;
   obtaining first information relating to a first one of the episodes of the feed;
   comparing, via the computing device, the first information with filter criteria;
   associating the first information with the user playlist upon the first information satisfying the filter criteria, said association occurring at a location on a network;
   obtaining second information relating to a second one of the episodes of the feed;
   comparing, via the computing device, the second information with the filter criteria;
   associating the second information with the playlist of the user based on the second criteria satisfying the filter criteria;
   after said associating the second information, automatically disassociating the first information from the playlist;
   automatically populating a portion of the playlist with at least a portion of the first information in response to said first associating step;
   automatically removing the at least a portion of the first information from the playlist in response to the associating the second information step, wherein the automatically disassociating step is concomitant to the obtaining second information step.

2. The method of claim 1, wherein the automatically disassociating step comprises:
   comparing data associated the first one of the episodes to episode removal criteria; and
   completing the automatically removing step when the data are in accordance with the episode removal criteria.

3. The method of claim 2, wherein the data are one or more of episode creation date data, episode download date data, episode access date data, episode review data, episode author data, episode character data, episode distributor data, episode volume data, episode number data, episode file size data and feed data.

4. The method of claim 2, wherein the data comprises the number of episodes of the media episodes associated with a portion of the playlist.

5. The method of claim 1, further comprising:
   indicating to the user that the first one of the episodes is available for review.

6. The method of claim 5, wherein
   the indicating step comprises displaying a message on a graphical user interface, and
   the displaying step occurs concomitant to activation of software associated with the playlist.

7. The method of claim 5, wherein
   the indicating step comprises displaying a message on a graphical user interface, and
   the displaying step occurs after the obtaining first information step.

8. The method of claim 1, further comprising:
   subscribing to the feed, thereby creating a subscription;
   wherein the obtaining step comprises:
   requesting access to the subscription; and
   querying the feed to determine whether the first one of the episodes is available for distribution.

9. The method of claim 1, further comprising:
   prior to the associating step, defining a user-selected portion of the playlist for receiving ones of the episodes.

10. The method of claim 9, wherein the associating step comprises:
    automatically associating at least a portion of the first information with the user-selected portion of the playlist.

11. The method of claim 1, further comprising:
    accessing, by the user the first one of the episodes,
    wherein the accessing comprises downloading the first one of the episodes to the user's computer; and
    after the downloading step, reviewing the first one of the episodes.

12. The method of claim 1, further comprising:
    accessing, by the user, the first one of the episodes, and
    after the accessing, automatically removing the first information from the playlist.

13. A system comprising:
    a processor;
    a memory;
    a playlist stored in the memory;
    first episode information related to a first episode of a subscription feed;
    a playlist management module implemented by the processor, wherein the playlist management module associates the first episode information with the playlist based on a comparison of the first episode information and filter criteria;
    second episode information related to a second episode of a subscription feed;
    the playlist management module associates the second episode information with the playlist based on a comparison of the second episode information and the filter criteria;
    the playlist management module automatically disassociates the first episode information from the playlist, said disassociation being based upon a comparison of the first episode information and episode removal criteria;

the playlist management module automatically populates a portion of the playlist with at least a portion of the first episode information in response to the association of the first information;

the playlist management module automatically removes the at least a portion of the first information from the playlist in response to the association of the second information, wherein said automatic disassociation is concomitant to obtaining the second episode information.

14. The system of claim 13, wherein the playlist and the playlist management module are located on single computerized device.

15. The system of claim 13, wherein the playlist is located on a first computerized device, and wherein the playlist management module is located on second computerized device, separate from the first computerized device.

16. The system of claim 15, wherein the first computerized device is a portable computerized device.

17. The system of claim 15, wherein the first computerized device is a subscription server.

18. A computer readable storage medium tangibly encoded with computer-executable instructions, the instructions when executed by a computer cause the computer to perform a method comprising:

receiving, at a computing device on a network, a first request to add a subscription feed to a user playlist, the feed comprising a plurality of episodes, the feed initially not present in the playlist prior to said first request;

obtaining first information relating to a first one of the episodes of the feed;

comparing, via the computing device, the first information with filter criteria;

associating the first information with the playlist of the user based on the first information satisfying the filter criteria;

obtaining second information relating to a second one of the episodes of the feed;

comparing, via the computing device, the second information with the filter criteria;

associating the second information with the playlist of the user based on the second criteria satisfying the filter criteria;

after said associating the second information, automatically disassociating the first information from the playlist;

automatically populating a portion of the playlist with at least a portion of the first information in response to the first associating step; and automatically removing the at least a portion of the first information from the playlist in response to the associating the second information step, wherein the automatically disassociating step is concomitant to the obtaining second information step.

* * * * *